(12) United States Patent
Estrop

(10) Patent No.: US 8,176,500 B2
(45) Date of Patent: May 8, 2012

(54) CLOSING A VIDEO STREAM OBJECT

(75) Inventor: Stephen J. Estrop, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/983,808

(22) Filed: Jan. 3, 2011

(65) Prior Publication Data

US 2011/0102672 A1 May 5, 2011

Related U.S. Application Data

(62) Division of application No. 10/273,505, filed on Oct. 18, 2002, now Pat. No. 7,219,352.

(60) Provisional application No. 60/372,880, filed on Apr. 15, 2002.

(51) Int. Cl.
*G06F 13/00* (2006.01)

(52) U.S. Cl. ......... 719/310; 719/321; 719/328; 719/330

(58) Field of Classification Search .................. 719/310, 719/321, 328, 330
See application file for complete search history.

(56) References Cited

U.S. PATENT DOCUMENTS

| 4,463,372 A | 7/1984 | Bennett et al. |
| 4,556,906 A | 12/1985 | Dischert et al. |
| 4,601,055 A | 7/1986 | Kent |
| 4,605,952 A | 8/1986 | Powers |
| 4,639,763 A | 1/1987 | Willis et al. |
| 4,729,012 A | 3/1988 | Jose et al. |
| 4,866,637 A | 9/1989 | Gonzalez-Lopez et al. |
| 4,951,149 A | 8/1990 | Faroudja |
| 5,014,327 A | 5/1991 | Potter et al. |
| 5,084,765 A | 1/1992 | Morita et al. |
| 5,179,641 A | 1/1993 | Comins et al. |
| 5,218,674 A | 6/1993 | Peaslee et al. |
| 5,235,432 A | 8/1993 | Creedon et al. |
| 5,287,042 A | 2/1994 | Haferl |

(Continued)

FOREIGN PATENT DOCUMENTS

EP 0600204 A 6/1994

(Continued)

OTHER PUBLICATIONS

Australian Office Action mailed Jul. 1, 2011 for Australian patent application No. 2010200535, a counterpart foreign application of US patent application No. 7,451,457.

(Continued)

*Primary Examiner* — Andy Ho
(74) *Attorney, Agent, or Firm* — Lee & Hayes, PLLC

(57) ABSTRACT

Techniques are provided for facilitating processing of interlaced video images for progressive video displays. A method receives from a renderer a query for a graphics device driver to a graphics processing capability that can be performed by an associated graphics device in de-interlacing video data, communicating the query to the graphics device driver, receiving from the graphics device driver a response to the query that identifies the graphics processing capabilities to the renderer, and communicating the response to the renderer. The method includes receiving from the renderer a further query for the graphics device driver to at least one input requirement associated with the identified graphics processing capability, communicating the further query to the graphics device driver, receiving from the graphics device driver a further response to the further query that identifies the input requirement(s) associated with the graphics processing capability, and communicating the further response to the renderer.

4 Claims, 4 Drawing Sheets

U.S. PATENT DOCUMENTS

| | | | |
|---|---|---|---|
| 5,309,257 A | 5/1994 | Bonino et al. |
| 5,325,448 A | 6/1994 | Katayama et al. |
| 5,455,626 A | 10/1995 | Xu et al. |
| 5,508,812 A | 4/1996 | Stevenson et al. |
| 5,539,465 A | 7/1996 | Xu et al. |
| 5,565,994 A | 10/1996 | Eschbach |
| 5,577,125 A | 11/1996 | Salahshour et al. |
| 5,602,943 A | 2/1997 | Velho et al. |
| 5,646,695 A | 7/1997 | Fujiwara et al. |
| 5,715,459 A | 2/1998 | Wagner et al. |
| 5,742,797 A | 4/1998 | Celi, Jr. et al. |
| 5,745,761 A | 4/1998 | Celi, Jr. et al. |
| 5,747,761 A | 5/1998 | Masuda |
| 5,757,386 A | 5/1998 | Celi, Jr. et al. |
| 5,768,487 A | 6/1998 | LeClair et al. |
| 5,793,371 A | 8/1998 | Deering |
| 5,870,503 A | 2/1999 | Kumashiro |
| 5,872,956 A | 2/1999 | Beal et al. |
| 5,892,847 A | 4/1999 | Johnson |
| 5,898,779 A | 4/1999 | Squilla et al. |
| 5,936,632 A | 8/1999 | Cuniff et al. |
| 5,940,141 A | 8/1999 | Faroudja et al. |
| 5,982,453 A | 11/1999 | Willis |
| 6,034,733 A | 3/2000 | Balram et al. |
| 6,047,295 A | 4/2000 | Endicott |
| 6,064,739 A | 5/2000 | Davis |
| 6,072,873 A | 6/2000 | Bewick |
| 6,144,390 A | 11/2000 | Ensor |
| 6,195,098 B1 | 2/2001 | Brittain et al. |
| 6,205,492 B1 | 3/2001 | Shaw et al. |
| 6,208,350 B1 | 3/2001 | Herrera |
| 6,212,574 B1 | 4/2001 | O'Rourke et al. |
| 6,222,542 B1 | 4/2001 | Poreh et al. |
| 6,246,768 B1 | 6/2001 | Kim |
| 6,262,773 B1 | 7/2001 | Westerman |
| 6,269,484 B1 | 7/2001 | Swan et al. |
| 6,295,068 B1 | 9/2001 | Peddada et al. |
| 6,304,733 B1 | 10/2001 | Ohira |
| 6,307,559 B1 | 10/2001 | Hancock et al. |
| 6,317,165 B1 | 11/2001 | Balram et al. |
| 6,323,875 B1 | 11/2001 | Millman et al. |
| 6,329,984 B1 | 12/2001 | Boss et al. |
| 6,331,874 B1 | 12/2001 | de Garrido et al. |
| 6,332,045 B1 | 12/2001 | Sawada et al. |
| 6,353,438 B1 | 3/2002 | Van Hook et al. |
| 6,359,631 B2 | 3/2002 | DeLeeuw |
| 6,369,855 B1 | 4/2002 | Chauvel |
| 6,370,198 B1 | 4/2002 | Washino |
| 6,466,226 B1 | 10/2002 | Watson et al. |
| 6,466,944 B1* | 10/2002 | Stokes | 707/999.01 |
| 6,496,183 B1 | 12/2002 | Bar-Nahum |
| 6,509,930 B1 | 1/2003 | Hirano et al. |
| 6,522,336 B1 | 2/2003 | Yuasa |
| 6,567,098 B1 | 5/2003 | D'Amora |
| 6,573,905 B1 | 6/2003 | MacInnis et al. |
| 6,587,129 B1 | 7/2003 | Lavendel et al. |
| 6,611,269 B1 | 8/2003 | Uehara et al. |
| 6,614,441 B1 | 9/2003 | Jiang et al. |
| 6,654,022 B1 | 11/2003 | Egan |
| 6,690,427 B2 | 2/2004 | Swan |
| 6,753,878 B1 | 6/2004 | Heirich et al. |
| 6,771,269 B1 | 8/2004 | Radecki et al. |
| 6,788,312 B1 | 9/2004 | Azar et al. |
| 6,806,982 B2 | 10/2004 | Newswanger et al. |
| 6,831,999 B2 | 12/2004 | Haikin |
| 6,833,837 B2 | 12/2004 | Hei La |
| 6,859,235 B2 | 2/2005 | Walters |
| 6,885,374 B2 | 4/2005 | Doyle et al. |
| 6,928,196 B1 | 8/2005 | Bradley et al. |
| 6,940,557 B2 | 9/2005 | Handjojo et al. |
| 6,952,215 B1 | 10/2005 | Devins et al. |
| 7,139,002 B2 | 11/2006 | Estrop |
| 7,151,863 B1 | 12/2006 | Bradley et al. |
| 7,158,668 B2 | 1/2007 | Munsil et al. |
| 7,180,525 B1 | 2/2007 | Naegle |
| 7,219,352 B2 | 5/2007 | Estrop |
| 7,363,351 B1* | 4/2008 | Shafer | 709/217 |
| 7,451,457 B2 | 11/2008 | Estrop |
| 7,643,675 B2 | 1/2010 | Evans et al. |
| 2001/0026281 A1 | 10/2001 | Takagi |
| 2002/0017759 A1 | 2/2002 | McClung et al. |
| 2002/0063801 A1 | 5/2002 | Richardson |
| 2002/0145610 A1 | 10/2002 | Barilovits |
| 2002/0145611 A1 | 10/2002 | Dye et al. |
| 2002/0154324 A1 | 10/2002 | Tay et al. |
| 2002/0171759 A1 | 11/2002 | Handjojo et al. |
| 2002/0191619 A1* | 12/2002 | Shafer | 370/401 |
| 2003/0016231 A1 | 1/2003 | Hei La |
| 2003/0066061 A1 | 4/2003 | Wu et al. |
| 2003/0117638 A1 | 6/2003 | Ferlitsch |
| 2003/0158979 A1 | 8/2003 | Tateyama et al. |
| 2003/0234892 A1 | 12/2003 | Hu et al. |
| 2004/0008284 A1 | 1/2004 | Kim |
| 2004/0032906 A1 | 2/2004 | Lillig |
| 2004/0054689 A1 | 3/2004 | Salmonsen et al. |
| 2005/0050554 A1 | 3/2005 | Martyn |

FOREIGN PATENT DOCUMENTS

| | | |
|---|---|---|
| EP | 0651577 A2 | 5/1995 |
| EP | 1074912 | 2/2001 |
| EP | 1231775 A2 | 8/2002 |
| JP | 03289887 | 12/1991 |
| JP | 6028117 A | 2/1994 |
| JP | 6059908 A | 3/1994 |
| JP | 8265590 A | 10/1996 |
| JP | 9006572 A | 1/1997 |
| JP | 10275072 A | 10/1998 |
| JP | 11175294 A | 7/1999 |
| JP | 11184649 A | 7/1999 |
| JP | 2000293608 A | 10/2000 |
| JP | 2000298565 A | 10/2000 |
| JP | 2000311240 A | 11/2000 |
| JP | 2000311240 A | 11/2000 |
| JP | 2000331150 A | 11/2000 |
| JP | 2001084154 A | 3/2001 |
| JP | 2001084246 A | 3/2001 |
| JP | 2001204045 A | 7/2001 |
| JP | 2002517855 | 6/2002 |
| JP | 2003153079 A | 5/2003 |
| JP | 2004023328 A | 1/2004 |
| JP | 2004029744 A | 1/2004 |
| SU | 1474701 A2 | 4/1989 |
| TW | 154225 | 3/1991 |
| WO | WO9916242 A1 | 4/1999 |
| WO | WO9964952 A1 | 12/1999 |
| WO | WO0161992 A | 8/2001 |
| WO | WO02067577 A | 8/2002 |

OTHER PUBLICATIONS

Office action for U.S. Appl. No. 12/247,926, mailed on May 27, 2011, Estrop et al., "Facilitating Interaction Between Video Renderers and Graphics Device Drivers".

Translated Chinese Office Action mailed Jun. 8, 2011 for Chinese patent application No. 200910137166.7, a counterpart foreign application of US patent No. 7,451,457.

Korean Office Action mailed May 24, 2011 for Korean Patent Application No. 10-2011-7005403, a counterpart foreign application of US Patent No. 7,643,675.

Translated Japanese Office Action mailed Jan. 21, 2011 for Japanese Patent Application No. 2006-522101, a counterpart foreign application of US Patent No. 7,643,675.

Canadian Office Action mailed Oct. 4, 2011 for Candian patent application No. 2,425,360, a counterpart foreign application of US patent No. 7,451,457, 2 pages.

Extended European Search Report mailed Nov. 23, 2011 for European patent application No. 11167428.9, 7 pages.

Office Action for U.S. Appl. No. 12/247,926, mailed on Nov. 4, 2011, Stephen J. Estrop, "Facilitating Interaction Between Video Renderers and Graphics Device Drivers", 32 pgs.

Translated Chinese Office Action mailed Jun. 24, 2011 for Chinese patent application No. 201010183522.1, a counterpart foreign application of US patent No. 7,643,675.

Translated Chinese Office Action mailed Jul. 7, 2011 for Chinese patent application No. 201010518248.9, a counterpart foreign application of US patent application No. 7,158,668, 10 pages.

Translated Japanese Office Action mailed Jan. 21, 2011 for Japanese Patent Application No. 2006-522101, a counterpart foreign application of US Patent No. 7,643,675, 4 pages.

Korean Office Action mailed Jul. 28, 2011 for Korean patent application No. 10-2006-7026069, a counterpart foreign application of US patent No. 7,158,668, 4 pages.

Australian Office Action mailed May 3, 2011 for Australian Patent Application No. 2010238551, counterpart foreign application of US Patent No. 7,158,668.

Translated Japanese Office Action mailed Apr. 4, 2011 for Japanese Patent Application No. 2007-523802, a counterpart foreign application of US Patent Application No. 7,158,668.

Adrian Ford and Alan Roberts, "Color Space Conversions", dated Aug. 11, 1998, accessed on Jul. 28, 2004, 31 pages.

Introductory page entitled "An Introduction to QuickTimeTM", accessed on Jan. 13, 2004, 2 pages.

Biao, et al., "Development and Application of the NT Devvice Driver in CNC Systems." Journal of Shanghai University (English Edition), ISSN 1007-6417, vol. 5, No. 4, (Dec. 2001) pp. 317-321.

Biao, et al., "Implementation of MPEG stream analyzer," Journal of China Institute of Communcations, vol. 22, No. 10, Oct. 2001, pp. 57-62, (English Abstract).

Birn, "Digital Lighting & Rendering", 2001.

Blome, "Introducing Some New Video Mixing Renderer Sample Applications", dated Apr. 2003, accessed on Feb. 2, 2004, 20 pages.

Charles Poynton, FAX about Color, 1997, accessed on Jul. 28, 2004, 24pages.

"Definitions of Parallel Processing on the Web", retrieved Jan. 5, 2005, Google, 3 pages.

Introductory page entitled "Deinterlacing and Frame-Rate Conversion," MSDN Library technical literature, accessed on Feb. 2, 2004, 1 page.

Ford, et al., "Color Space Conversions", dated Aug. 11, 1998, accessed on Jul. 28, 2004, 31 pages.

"Gamma, Linear Color Space and HDR," accessed on Jul. 21, 2006, 7 pages.

"GPU: Changes Everything", Aug. 31, 1999.

He, et al., "Development and Application of the NT Device Driver in CNC System," Journal of Shanghai University (English Edition), ISSN 1007-6417, vol. 5, No. 4 (Dec. 2001), pp. 317-321.

Hui Xin-biao, Dong Yong-qiang, Qi Dan-ging, "Implementation of MPEG stream analyzer," Journal of China Institute of Communcations, vol. 22, No. 10, Oct. 2001, pp. 57-62.

Hui, et al., "Implementation of MPEG stream analyzer," Journal of China Institute of Communcations, vol. 22, No. 10, Oct. 2001, pp. 57-62.

Huo Xin-biao, Xia Jun-sheng, Fang Ming-lun, "Development and Application of the NT Devvice Driver in CNC Systems." Journal of Shanghai University (English Edition), ISSN 1007-6417, vol. 5, No. 4, (Dec. 2001) pp. 317-321.

Mann, "The Graphics Rendering Pipeline", 1997.

Marjanovic, "Chroma Subsampling Standards", Mar. 31, 2003.

Mirza, et al., "DirectX 9.0: Introducing the New Managed 3D Graphics API in the .Net Framework", from the Apr. 2003 issue of MSDN Magazine, accessed on Feb. 2, 2004, 10 pages.

Musil, et al., "The Chroma Upsampling Error and the 4:2:0 Interlaced Chroma Problem", Secrets of Home Theater and High Fidelity, DVD Benchmark, Apr. 2001, Dec. 2002, Jan. 2003, 20 pages.

"Parallel Processing", Definitions on Google, accessed on Jan. 5, 2005.

Poynton, "Digital Video and HDTV: Algorithms and Interfaces", Morgan Kaufmann publishers, 2003, table of contents, pp. xi to xxiii, and chapter 24, pp. 281-300.

Poynton, "FAX about Color", 1997, accessed on Jul. 28, 2004, 24pages.

Poynton, "Frequently Asked Questions about Gamma", 1998 accessed on Jul. 28, 2004, 12 pages.

Programming in Java Advanced Imaging, Chapter 5, Sun Microsystems, Inc., 1999, accessed on Jul. 21, 2006, 12 pages.

Rawlins, "A Standards Solution to Your Graphics Problems," Graphic Software Systems, Inc., Frontiers in Computer Graphics, Proceedings of Computer Graphics Tokyo '84, copyright by Springer-Verlag Tokyo 1985, pp. 375-416.

Search Report from Malaysian Application No. PI 20031681, which is related to the subject application, dated Jul. 13, 2007, one page.

"Understanding Analog Video Signals", Dallas Maxim, Appliction Note 1184, Sep. 4, 2002, 12 pages.

Union, "Accessing Device Drivers from C#," Windows Developer Magazine, vol. 13, No. 4, Apr. 2002, pp. 19,20,22,23,26,27.

Wolfgang, "Direct3D ShaderX: Vertex and Pixel Shader Tips and Tricsk," Wordware Publishing, Inc., 2002, pp. 72-124.

"YCbCr to RGB Considerations" Intersil Application note, AN9717, Mar. 1997, 2 pages.

"YUV", definition from Wikipedia.

* cited by examiner

CLOSING A VIDEO STREAM OBJECT

RELATED PATENT APPLICATIONS

This Non-Provisional Application is a continuation of co-pending Non-Provisional application Ser. No. 11/276,695, filed on Mar. 10, 2006, titled "Methods and Apparatuses for Facilitating Processing Interlaced Video Images for Progressive Video Displays," which is incorporated by reference herein in its entirety. The application Ser. No. 11/276,695 is a divisional of Non-Provisional application Ser. No. 10/273,505, filed on Oct. 18, 2002, titled "Methods and Apparatuses for Facilitating Processing of Interlaced Video Images For Progressive Video Displays," now U.S. Pat. No. 7,219,352, which is incorporated by reference herein in its entirety. The application Ser. No. 10/273,505, in turn, claims benefit of priority from U.S. Provisional Application Ser. No. 60/372,880, filed Apr. 15, 2002, and titled "Methods and Apparatuses for Facilitating De-Interlacing of Video Images", which is incorporated by reference herein in its entirety.

TECHNICAL FIELD

This invention relates generally to video processing and display, and more particularly to facilitating processing of interlaced video images for progressive video displays.

BACKGROUND

Video image sequences can usually be categorized into two different types: progressive and interlaced. With progressive video all the picture elements comprising a frame of video data are sampled at the same moment in time. With interlaced video, alternative lines of the video image are sampled at alternate moments in time; the resulting interlaced video frame is therefore made up of two "fields" each field being half the height of the video frame.

Examples of interlaced video sequences are TV signals and the output of DV camcorders. Examples of progressive video sequences are certain DVD's and computer generated video such as the output of the Windows® Media Video encoder. Additionally, some professional-level video cameras also generate progressive video.

Computer monitors and other like display devices are examples of a "progressive display system" and are therefore able to display progressive video without any additional processing. Interlaced video cannot be displayed on a computers monitor unless it has first been "de-interlaced".

The current technique for de-interlacing video in a conventional personal computer (PC) requires the use of a "graphics overlay device" by a graphics processor. There are several restrictions and limitations to the use of the graphics overlay devices and as a consequence of this their usage will likely be deprecated in the future. For example, for most PCs there can only be one graphics overlay device. Additionally, most graphics overlay devices only provide a crude de-interlacing algorithm, such as, e.g., the BOB algorithm.

Consequently, for these reasons and others there is a need for improved methods and apparatuses for facilitating the de-interlacing of video.

SUMMARY

In accordance with certain exemplary aspects of the present invention, methods and apparatuses are provided for facilitating the de-interlacing of video. By way of example, interfacing methods and apparatuses are provided in certain implementations for instructing graphics processor logic (i.e., hardware, firmware and/or software) to de-interlace a video field to produce a single video frame that can be displayed on a computer monitor and/or other like display devices. This can be accomplished without the need for a graphics overlay device.

In accordance with certain implementations of the present invention, a method is provided, which includes causing a graphics device driver to identify to a renderer at least one graphics processing capability associated with a corresponding graphics device, and causing the graphics device driver to identify to the renderer at least one input requirement associated with the identified graphics processing capability.

In other implementations of the present invention, a graphics device driver is operatively configured to identify to a renderer at least one graphics processing capability associated with a corresponding graphics device and at least one input requirement associated with the identified graphics processing capability.

In accordance with still other implementations of the present invention, a computer-readable medium is provided, which includes computer-executable instructions for causing at least one processing unit to cause a graphics device driver to identify to a renderer at least one graphics processing capability associated with a corresponding graphics device, and also cause the graphics device driver to identify to the renderer at least one input requirement associated with the identified graphics processing capability.

The above stated needs and others are also met by a method that includes causing a renderer to identify to a graphics device driver a description of interlaced video data to be processed by a graphics device associated with the graphics device driver. The method further includes causing the graphics device driver to identify to the renderer at least one graphics processing capability associated with the graphics device that may be used to provide de-interlacing and/or other applicable processes, and causing the renderer to select at least one of the identified graphics processing capabilities and request input requirements from the graphics device driver for the selected graphics processing capability/capabilities. The method also includes causing the graphics device driver to identify to the renderer the input requirements associated with the identified graphics processing capability/capabilities.

In certain implementations, an apparatus is provided, which includes rendering logic, graphics device logic, and interface logic. The interface logic operatively couples the rendering logic and the graphics device logic such that the rendering logic can provide a description of interlaced video data to be processed by a graphics device associated with the graphics device logic, the graphics device logic can identify at least one graphics processing capability associated with the graphics device, the rendering logic can request input requirements from the graphics device logic for at least one selected graphics processing capability, and the graphics device logic can identify at least one input requirement associated with the at least one selected graphics processing capability.

In accordance with yet another exemplary implementation, a method is provided that includes receiving from a renderer a query for a graphics device driver as to at least one graphics processing capability that can be performed by an associated graphics device in de-interlacing video data, communicating the query to the graphics device driver, receiving from the graphics device driver a response to the query that identifies the graphics processing capability/capabilities to the renderer, and communicating the response to the renderer. In other implementations the method also includes receiving from the renderer a further query for the graphics device driver as to at least one input requirement associated with the identified graphics processing capability, communicating the further query to the graphics device driver, receiving from the graphics device driver a further response to the further query that identifies the input requirement(s) associated with the graphics processing capability, and communicating the further response to the renderer.

In still other implementations of the present invention a method of communicating between a rendering process and a graphics device driver process that is associated with a graphics device is provided. Here, for example, the method includes issuing, by a rendering process, a query call having at least one call parameter comprising a description of video data to be processed by the rendering process and a graphics device, receiving, by the graphics device driver process, the query call and parsing the query call to retrieve the call parameter(s), and issuing, by the graphics device driver process, a query acknowledgment call having at least one acknowledgment parameter comprising an identifier for at least one supportive processing capability that the graphics device can provide based on the description of video data.

Another exemplary method includes issuing, by a rendering process, a query call having at least one call parameter comprising an identifier for a selected supportive processing capability that a graphics device can provide to process selected video data, receiving, by a graphics device driver process associated with the graphics device, the query call and parsing the query call to retrieve the call parameter(s), and issuing, by the graphics device driver process, a query acknowledgment having at least one acknowledgment parameter comprising at least one input requirement associated with the selected supportive processing capability.

In accordance with still other aspects of the present invention, a method for establishing a video stream object between a rendering process and a graphics device having an associated graphics device driver is provided. Here, for example, the method includes issuing, by a rendering process, an open stream call having at least two call parameters including an identifier for a selected supportive processing capability that a graphics device is to perform while processing streamed video data and a description of video data to be processed by the rendering process and the graphics device while processing the streamed video data. The method further includes receiving, by a supporting process, the open stream call and parsing the open stream call to retrieve the call parameters, and issuing, by the supporting process, a stream identifier corresponding to a video stream object provided by the supporting process.

In still other implementations, a method for closing a video stream object is provided. Here, for example, the method includes issuing, by a rendering process, a close stream call having at least one call parameter comprising a stream identifier corresponding to a previously established video stream object, and receiving, by a supporting process, the close stream call and parsing the close stream call to retrieve the call parameter, and causing the supporting process to close the previously established video stream object.

Some of the above stated needs and others are also addressed by a method for use in manipulating interlaced video data. The method includes accessing interlaced video data including top field data and bottom field data associated with a video surface having a width, a height and a stride. The method further includes producing a reinterpreted video surface by isolating the top and bottom field data, and configuring the isolated top and bottom field data in the reinterpreted video surface such that the reinterpreted video surface has a reinterpreted height that is less than the height and a reinterpreted stride that is greater than the stride.

BRIEF DESCRIPTION OF THE DRAWINGS

A more complete understanding of the various methods and apparatuses of the present invention may be had by reference to the following detailed description when taken in conjunction with the accompanying drawings wherein.

DETAILED DESCRIPTION

Figure 1:
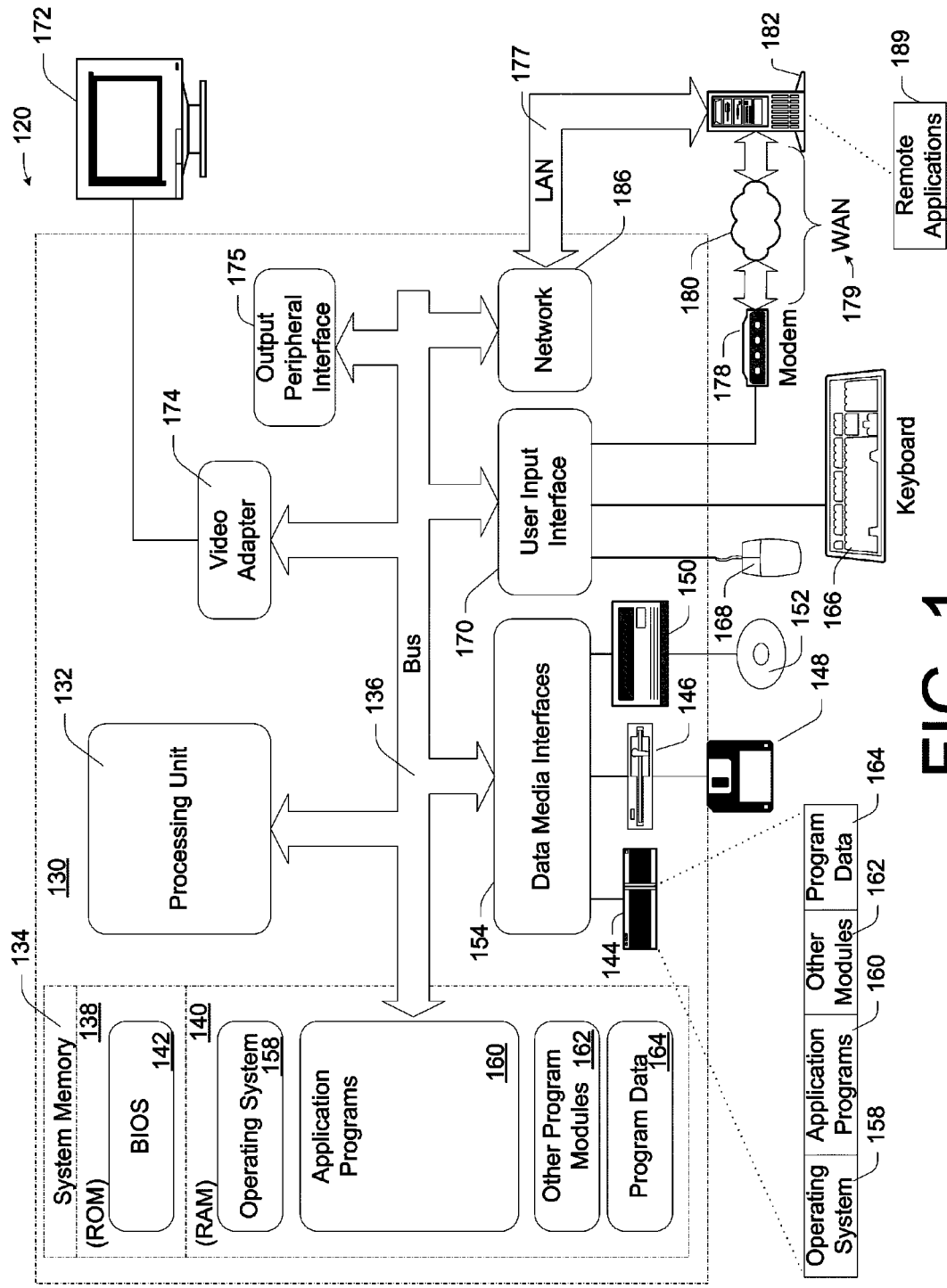
FIG. 1 is a block diagram generally illustrating an exemplary computer system suitable for use with certain implementations of the present invention.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like.

An Exemplary Video Display Environment:

FIG. 1 illustrates an example of a suitable computing environment 120 on which the subsequently described methods and apparatuses may be implemented. Exemplary computing environment 120 is only one example of a suitable computing environment and is not intended to suggest any limitation as to the scope of use or functionality of the improved methods and systems described herein. Neither should computing environment 120 be interpreted as having any dependency or requirement relating to any one or combination of components illustrated in computing environment 120.

The improved methods and apparatuses herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM/R/RW, DVD-ROM/R/RW/+R/RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and systems described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175. Video adapter 174 typically includes a video graphics device.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

De-Interlacing Video

As mentioned, there is a need to de-interlace certain types of video image data so that it can be correctly displayed on a computer's monitor or other like display device. Previous releases of Microsoft® Windows® operating systems, for example, have relied on a "graphics overlay device" to de-interlace the video as it is displayed on the computer's monitor. There are several drawbacks to this and other similar techniques including, for example: (1) There is only one "graphics overlay device" in the computer, therefore only a single video stream can be displayed correctly; (2) The graphics overlay device has to be "keyed" to computers desktop display, this means that if an end-user presses the print screen key he only captures the key color not the video image currently being displayed; (3) When the user drags a window to a new location there are occasional flashes of key color displayed where there should be video displayed: (4) If a user drags a semi transparent window over the top of the video play back window, key color is blended with the user's window not the video image.

Furthermore, the typical method of de-interlacing employed by contemporary graphics overlay device is of a very low quality—it is at a level much lower than that of consumer device such as a television.

Those skilled in the art will recognize still other drawbacks to the current technology.

The novel methods and apparatuses presented herein enable graphics processors to de-interlace the video image without the need of a graphics overlay device. The techniques presented also allow graphics processors to use more advanced de-interlacing algorithms, an in particular ones that offer a significant improvement in the visual quality of the video image displayed when compared to traditional arrangements.

Exemplary Reinterpretation of Interlaced Fields

Figure 2:
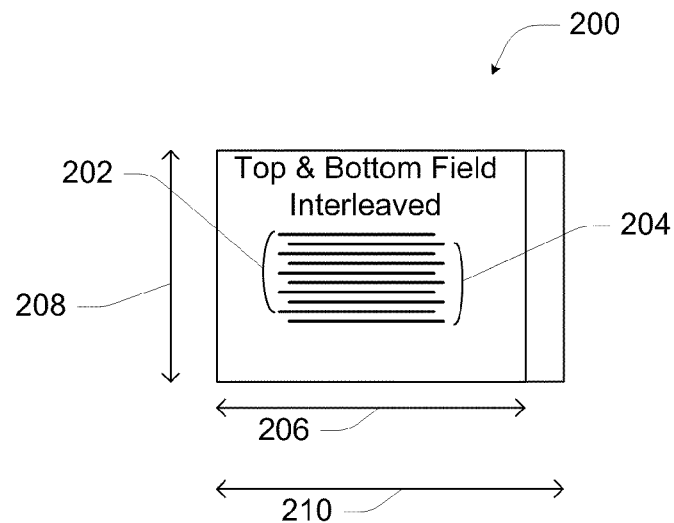
FIG. 2 is an illustrative diagram depicting a video surface that contains two interlaced fields, in accordance with certain exemplary implementations of the present invention.
Figure 2:
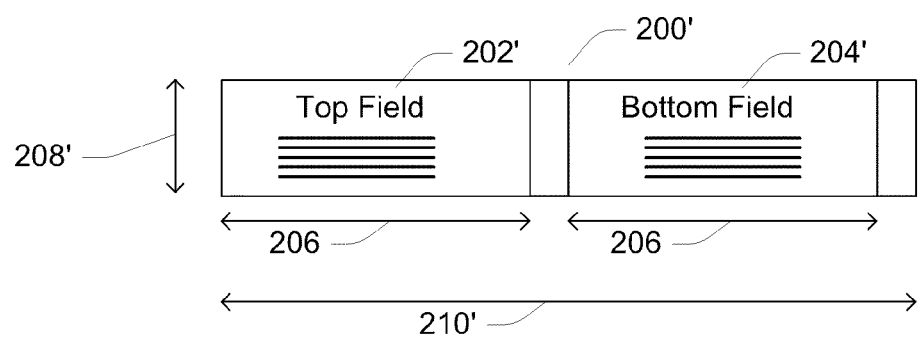

At the top of FIG. 2, an interleaved video surface 200 is shown as having two interleaved fields, namely a top field 202 and a bottom field 204. Video surface 200 has a width 206, a height 208 and a stride 210. At the bottom of FIG. 2, a reinterpreted video surface 200' is shown as having an isolated top field 202' and bottom field 204'. Here, video surface 200' has a height 208' that is ½ the height of the corresponding interlaced video surface 200 and also a stride 210' that is twice the stride of the corresponding interlaced video surface 200.

Interface Between Renderer and Graphics Device

Figure 3:
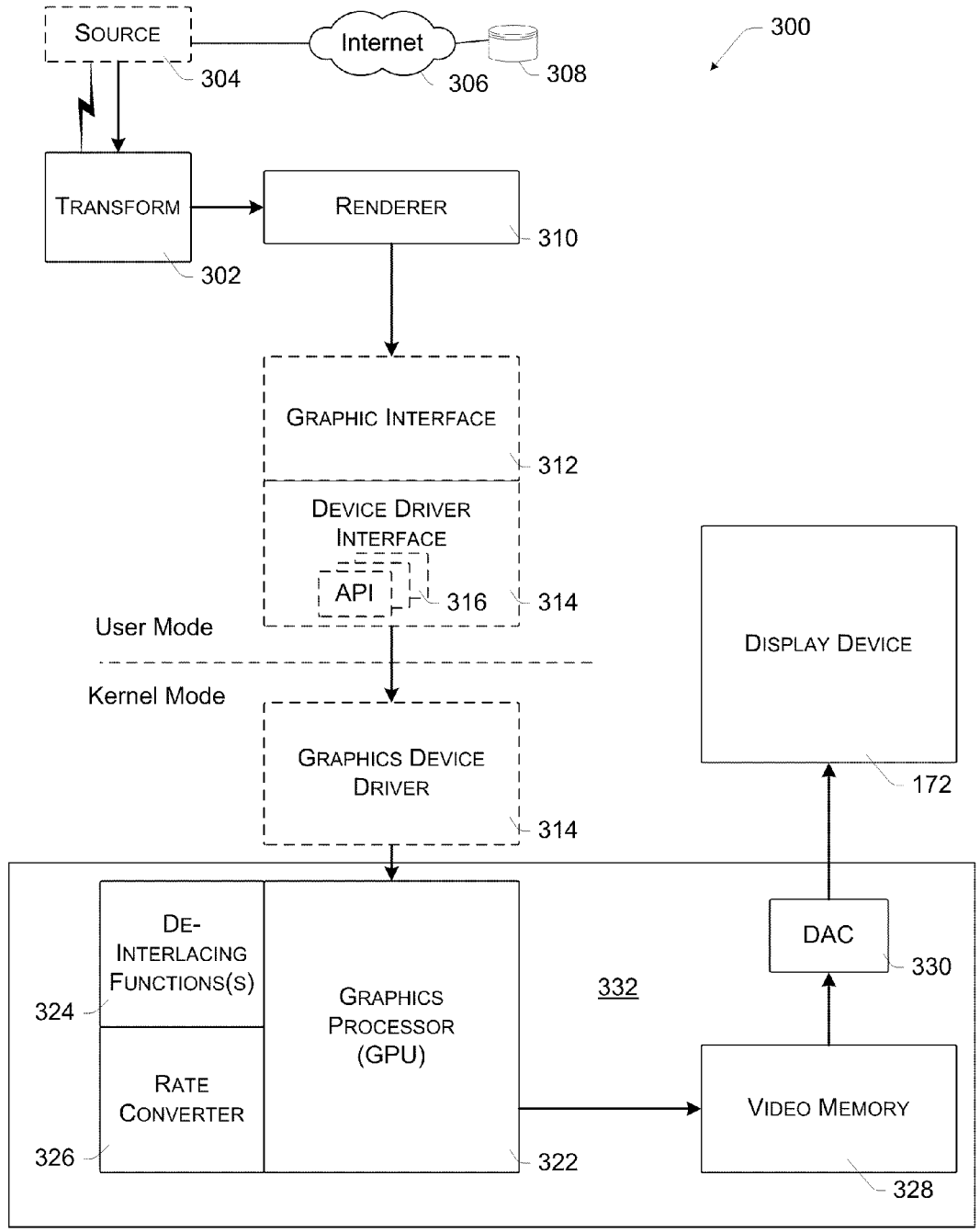
FIG. 3 is a block diagram depicting certain functional elements of a computer or like device that is configured to render video signals, in accordance with certain exemplary implementations of the present invention.

FIG. 3 is an illustrative block diagram depicting certain elements/functions that are employed in rendering video signals within a computer, such as illustrated in FIG. 1. These various elements and/or functions are implementable in hardware and/or software, as applicable. Many of these elements and/or functions are representative of known technologies. In accordance with certain aspects of the present invention, the interface (e.g., Device Driver Interface, DDI) between the graphics interface and the graphics device driver is modified so as to not require a graphics overlay and/or to improve on the ability of the renderer to better communicate with the graphics device driver/logic and utilize improvements with regard to interlacing, frame rate conversion, and/or other capabilities of the graphics device. Thus, following a description of the exemplary apparatus 300 in FIG. 3, applicable methods are presented with regard to FIG. 4 and further in the form of application programming interfaces (APIs) in accordance with certain further exemplary implementations of the present invention.

Apparatus 300 includes transform logic 302, which, for example, may include instructions performed by a central processing unit, a graphics processing unit, and/or a combination thereof Transform logic 302 is configured to receive coded video data from at least one source 304. The coded video data from source 304 is coded in some manner (e.g., MPEG-2, etc.) and transform logic 302 is configured to decode the coded video data. By way of example, source 304 may include a magnetic disk and related disk drive, an optical disc and related disc drive, a magnetic tape and related tape drive, memory, a transmitted signal, or other like source configured to deliver or otherwise provide the coded video data to transform logic 302. In certain implementations, the source may include a network and remote source, such as represented by Internet 306 and a remote source 308.

The decoded video data output by transform logic 302 is provided to at least one renderer 310. Renderer 310 is configured to aid the transform logic 302 in decoding the video stream, aspect ratio correct the video image so that it matches the display device's 172 aspect ratio, blend any other auxiliary image data such as closed captions or DVD sub-picture images with the video image, and then at the appropriate time submit the video image data to the graphics interface logic 312 for display on the display device 172. The resulting rendered video data is then provided to graphic interface logic 312. Graphic interface logic 312 may include, for example, DirectDraw®, Direct3D®, and/or other like logic. Graphic interface logic 312 is configured to provide an interface between renderer 310 and a graphics device 332.

The data output by graphic interface logic 312 is provided to a graphics device driver 320 using a device driver interface 314. Here, device driver interface 314 is depicted as having at least one application programming interface (API) 316 associated with it. Device driver interface 314 is configured to support the interface between renderer 310 and graphics device driver 314

As illustrated in FIG. 3, in certain implementations device driver interface 314 and graphics device driver 320 may further be categorized as being either part of user mode logic 318 or kernel mode logic 319 with respect to the operating environment of graphics device 332.

In this example, the video data output by renderer 310 is eventually provided to a graphics processor unit (GPU) 322, which is configurable to perform de-interlacing logic 324, frame rate converter logic 326 (optional), and/or other processing of the video data. In this example, as their names suggest, de-interlacing logic 324 is configured to de-interlace the video data and frame rate converter logic 326 is configured to modify the frame rate as needed/desired.

The output from GPU 322 is provided to video memory 328. When video memory 328 is read, the resulting data is then provided to a digital to analog converter (DAC) 330, which outputs a corresponding analog video signal suitable for display by display device 172. In other configurations, the display device 172 may be configured to process the digital data from video memory 328 without the need for DAC 330. As illustrated, a graphics device 332 may include GPU 322, video memory 328 and DAC 330. In certain implementations, graphics device 332 takes the form of a video graphic card that can be configured within a PC or like device.

The configuration shown in FIG. 3 is but one example of a video data processing apparatus. Those skilled in the art will recognize that other possible configurations may also benefit from the methods and apparatuses of the present invention.

Exemplary Interface Operation

Figure 4:
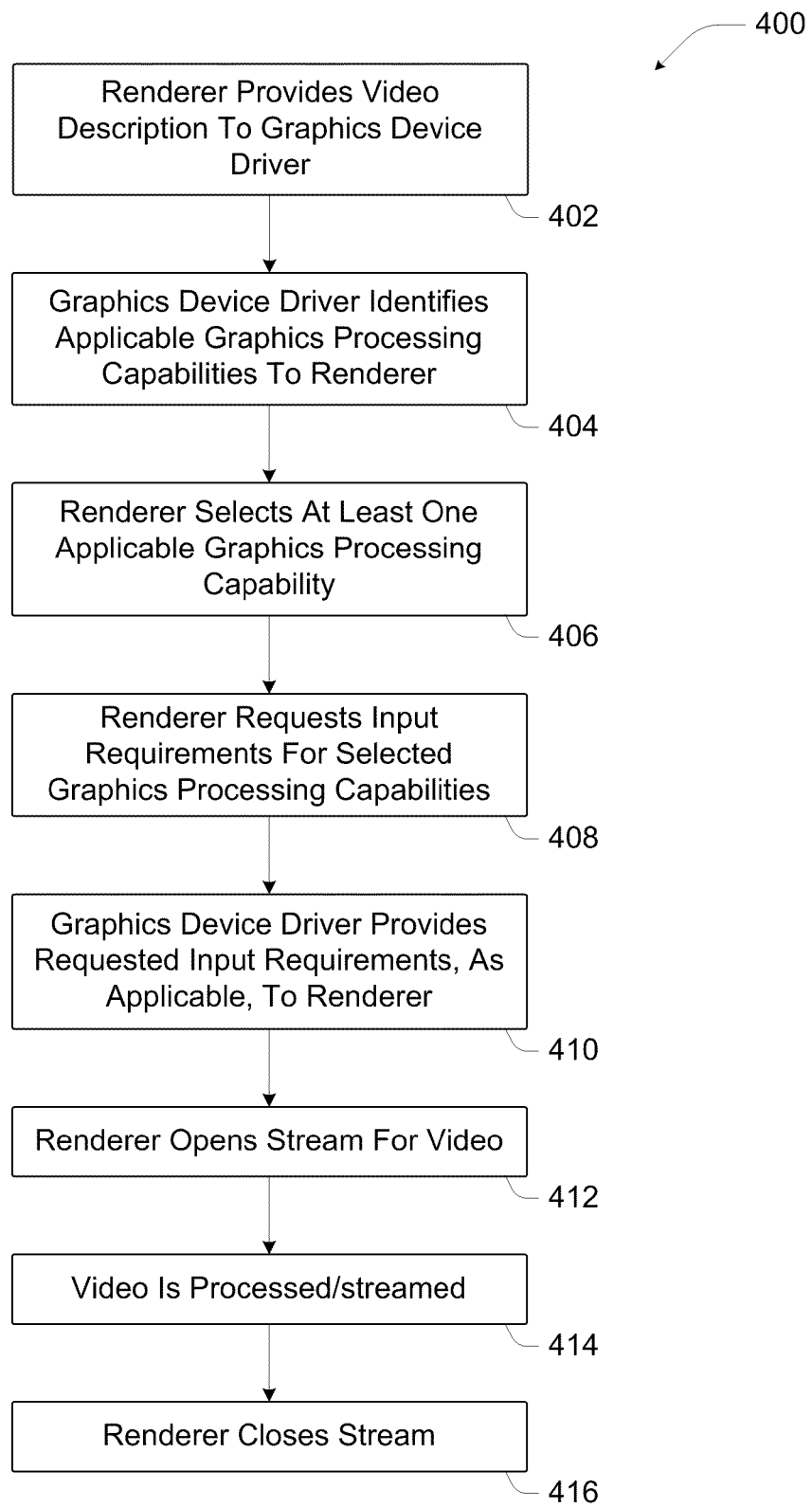
FIG. 4 is a flow diagram depicting a method for processing video signals, in accordance with certain exemplary implementations of the present invention.

Attention is now drawn to the flow diagram in FIG. 4, which depicts a method 400 for interfacing renderer 310 and graphics device 332. One or more APIs 316 may be configured to perform or otherwise support method 400.

In act 402, renderer 310 provides a description of the video data to graphics device driver 314. Here, the video data has been selected to be processed and eventually presented through display device 172. In response, graphics device driver 314, in act 404, identifies applicable or otherwise available graphics processing capabilities of graphics device 332. The identified graphics capabilities are associated with GPU 322 or other like logic. In certain implementations, for example, one or more de-interlacing functions, rate converter functions and/or other applicable functions may be identified in some manner.

In act 406, renderer 310 or other associated logic selects at least one of the identified graphics processing capabilities. In act 408, renderer 310 requests any applicable input requirements for the selected graphics processing capability/capabilities. In response to the request, in act 410, graphics device driver 314 provides any applicable input requirements to renderer 310.

In act 412, renderer 310 opens a stream for the video data. In act 414, renderer 310 and graphics device 322 process, stream and eventually display the video. In act 416, renderer 310 closes the stream that was opened in act 412.

Exemplary Interface Implementation

Apparatus 300 is one example of a video processing system that can be arranged to provide de-interlacing, frame rate conversion and/or other processing of video data. By way of further example, in accordance with certain exemplary implementations of the present invention, Microsoft® DirectX® VA can be extended or otherwise enhanced to support de-interlacing and also frame rate conversion associated with the processing of image data that is to be rendered and displayed. Additional related information can be found in a Microsoft® Windows® Platform Design Note entitled DirectX® VA: Video Acceleration API/DDI, dated Jan. 23, 2001, and which is incorporated herein by reference.

This following describes APIs that advantageously extend Microsoft® DirectX® VA to support de-interlacing, frame rate conversion and/or other processing capabilities for video content in graphics device drivers. This description provides driver developers and others skilled in the art with a clear understanding of the exemplary APIs and methods and apparatuses provided herein.

While the methods and apparatuses are described herein in terms of APIs that are applicable to the current evolution of Microsoft® Window® operating systems for PCs, it should be understood that the methods and apparatuses are also applicable to other operating systems and/or other devices.

Video that is interlaced can, for example, be de-interlaced using the DirectX® Video Acceleration and Direct3D® 9 APIs for video. The graphics engine (e.g., GPU) and a hardware overlay, if present, should support a minimum of BOB and weave de-interlacing functionality.

The output of the de-interlacing or frame rate conversion process is a progressive frame. The de-interlaced and frame rate conversion interface described in this document is independent of all video presentation mechanisms. In the following examples, the de-interlaced output is provided in the target DirectDraw® surface. Doing so precludes the need for conventional hardware overlay solutions.

De-interlacing as used herein means to generate a progressive video frame at a given time t by reconstructing the missing lines from a field at time t. Frame rate conversion as used herein means generating a new progressive video frame at any arbitrary time t from a sequence of fields or frames.

A video sample can be, for example, a DirectDraw® surface that contains one or two video fields. Flags are associated with the sample to indicate the number of fields contained in the surface and the temporal order of the fields. The video can arrive in this surface through many possible routes, such as the output of a DX-VA video decoder process, the output of a video port, or the output of a host-based video decoder, etc.

Single-Field De-interlacing Example

Most graphics adapters that can perform a StretchBlt can also perform a simple BOB-style de-interlacing. This is essentially simply a matter of reinterpreting the memory layout of the video within a DirectDraw® surface. After the surface has been reinterpreted to isolate the two fields, for example, each line within a field is doubled (e.g., by interpolation to generate in-between lines). A single frame line offset may be required to prevent the de-interlaced video from displaying vertical jitter.

When a video surface contains two interlaced fields, as shown, e.g., in FIG. 2, the memory layout of the surface can be reinterpreted in order to isolate each field. This can be achieved, for example, by doubling the stride of the original surface and dividing the height of the surface in half, as illustrated. After the two fields are isolated in this way, they can easily be de-interlaced by stretching the individual fields to the correct frame height. Additional horizontal stretching or shrinking can also be applied to correct the aspect ratio for the pixels of the video image.

Graphics device driver 320 (FIG. 3) can be configured to identify the graphics device's ability to do this to renderer 310 (e.g., a DirectX® Video Mixing Renderer (VMR), or the like) through a "Query Capabilities" API (e.g., DeinterlaceQueryModeCaps) described in greater detail below.

The height of the individual field can be stretched vertically by line replication or through the preferred method of a filtered stretch, for example. If the line replication method is used, the resulting image may have a "blocky" appearance. If a filtered stretch is used, the resulting image may have a slight "fuzzy" appearance.

De-Interlace and Frame Rate Conversion API Descriptions

The exemplary APIs 316 described herein can be divided into two functional groups of methods. The first group includes a set of methods and apparatuses that can be used to determine the de-interlacing capabilities of the graphics device. The second group includes a set of methods and apparatuses that are used for creating and using a de-interlace stream object.

The APIs 316 are designed to be part of a device driver interface 314 supporting a graphic interface 312 and interfacing with a graphics device driver 320. In accordance with certain implementations of the present invention, the APIs 316 are not necessarily user-mode APIs that are accessible by applications. However, in other implementations they may be.

Determining Available De-interlace Modes: "DeinterlaceQueryAvailableModes"

A DeinterlaceQueryAvailableModes method can be used to query the de-interlacing, frame rate conversion modes and/or other functions/modes (capabilities) that are available for a particular input video format. Here, for example, a globally unique identifier (GUID) or other suitable identifier is provided for each mode returned by the graphics device. The GUIDs can, for example, be returned in some particular order, such as, e.g., in order of descending (or ascending) quality. Thus, for example, the highest quality mode may occupy the first element of the GUID array that is returned. Thus, by way of example consider:

```
HRESULT
DeinterlaceQueryAvailableModes(
    [in] LPDXVA_VideoDesc lpVideoDescription,
    [in out] LPDWORD lpdwNumModesSupported,
    [in out] LPGUID pGuidsDeinterlaceModes
    );
```

In this example, the lpVideoDescription parameter is a "description" of the type of video to be de-interlaced, rate-converted and/or otherwise processed. The lpVideoDescription parameter is passed to the graphics device driver so that it may tailor the graphics device to support the resolution and format of the source video. For example, the graphics device might be able to perform a three-field adaptive de-interlace of 480i content, but it might only be able to BOB 1080i content.

In accordance with certain implementations, the graphics device should be able to at least support BOB, for example, using the existing Blt'ter hardware. Thus, consider the following example:

```
typedef enum _DXVA_SampleFormat {
    DXVA_SamplePreviousOutputFrame = 1,
    DXVA_SampleProgressiveFrame = 2,
    DXVA_SampleFieldInterleavedEvenFirst = 3,
    DXVA_SampleFieldInterleavedOddFirst = 4,
    DXVA_SampleFieldSingleEven = 5,
    DXVA_SampleFieldSingleOdd = 6,
```

```
} DXVA_SampleFormat;
typedef struct _DXVA_Frequency {
    DWORD Numerator;
    DWORD Denominator;
} DXVA_Frequency;
typedef struct _DXVA_VideoDesc {
    DWORD Size;
    DWORD SampleWidth;
    DWORD SampleHeight;
    DXVA_SampleFormat;
    D3DFORMAT d3dFormat;
    DXVA_Frequency InputSampleFreq;
    DXVA_Frequency OutputFrameFreq;
} DXVA_VideoDesc, * LPDXVA_VideoDesc;
```

The DXVA_VideoDesc data structure passes to the driver the intention of the de-interlacing or frame rate conversion to be performed, as further shown in the following examples.

Example: De-Interlacing 720×480i Content

To de-interlace 720×480i content that is sourced as two fields per sample at a frequency of 29.97 Hz, the DXVA_VideoDesc data structure may contain the following:
SampleWidth=720;
SampleHeight=480;
SampleFormat=DXVA_SampleFieldInterleavedOddFirst;
d3dFormat=D3DFMT_YUY2;
InputSampleFreq.Numerator=30000; //29.97
InputSampleFreq.Denominator=1001;
OutputFrameFreq.Numerator=60000; //59.94;
OutputFrameFreq.Denominator=1001;

If the intention is to de-interlace and perform frame rate conversion, the OutputFrameFreq field can be as follows:
OutputFrameFreq.Numerator=85; //85 Hz monitor Frequency
OutputFrameFreq.Denominator=1;

If the intention is to just de-interlace a single field to a progressive frame for later MPEG encoding, the OutputFrameFreq field can be as follows:
OutputFrameFreq.Numerator=30000; //29.97
OutputFrameFreq.Denominator=1001;

Example: Frame-Rate-Converting 480p Content

To perform frame rate conversion on 480p content, for example, to match the monitor display frequency, the DXVA_VideoDesc structure may contain the following:
SampleWidth=720;
SampleHeight=480;
SampleFormat=DXVA_SampleProgressiveFrame;
d3dFormat=D3DFMT_YUY2;
InputSampleFreq.Numerator=60; //60 Hz
InputSampleFreq.Denominator=1;
OutputFrameFreq.Numerator=85; //85 Hz monitor Frequency
OutputFrameFreq.Denominator=1;

Note that de-interlacing and frame-rate-conversion may also be performed together using the above exemplary structures.

Exemplary De-Interlace Modes

A graphics device may, for example, report the following possible de-interlace modes:

BOB (line doubling) using the Blt'ter, for example. In certain implementations, this mode should always be available.

Simple Switching Adaptive. Here, for example, either a blend of two adjacent fields if low motion is detected for that field, or BOB if high motion is detected.

Advanced 3D Adaptive. Here, for example, the missing lines are generated through some adaptive process that is likely proprietary to the graphics device. The process may, for example, use several reference samples to aid in the generation of missing lines. The reference samples may be temporally in the past or future. For example, three-dimensional linear filtering would fall into this category.

Motion Vector Steered. Here, motion vectors of the different objects in the scene are used to align individual movements to the time axis before interpolation takes place.

Those skilled in the art will recognize other possible de-interlacing capabilities that can also be supported by the methods and apparatuses of the present invention.

Exemplary Frame Rate Conversion Modes

Certain exemplary graphics devices may report the following possible frame rate conversion modes:

Frame repeat/drop. This may not be a recommended mode because it tends to consume extra memory bandwidth by copying the selected source sample into the destination surface.

Linear temporal interpolation. Here, a future and a previous reference field are Alpha blended together to produce a new frame.

Motion-vector steered. Motion vectors of the different objects in the scene are used to align individual movements to the time axis before interpolation takes place.

Those skilled in the art will recognize other possible frame rate conversion and/or other processing capabilities that can also be supported by the methods and apparatuses of the present invention.

Determining Input Requirements: "DeinterlaceQueryModeCaps"

After renderer 310 has determined the de-interlace modes available for a particular video format, it queries the graphics device driver 320 again to determine more detailed information related to the input requirements of a particular de-interlace mode and/or any other applicable video processing that has been selected. Thus, consider the following example:

```
HRESULT
DeinterlaceQueryModeCaps(
    [in] LPGUID pGuidDeinterlaceMode,
    [in] LPDXVA_VideoDesc lpVideoDescription,
    [out] DXVA_DeinterlaceCaps* lpDeinterlaceCaps
);
```

By way of further example, graphics device driver 320 can be configured to report the capabilities of GPU 322 for a selected mode in an output DXVA_DeinterlaceCaps structure for lpDeinterlaceCaps. For example, consider the following:

```
typedef struct _DXVA_DeinterlaceCaps {
    DWORD Size;
    DWORD NumPreviousOutputFrames;
    DWORD InputPool;
    DWORD NumForwardRefSamples;
    DWORD NumBackwardRefSamples;
    D3DFORMAT OutputFrameFormat;
    DWORD VideoProcessingCaps;
    DWORD DeinterlaceTechnology;
} DXVA_DeinterlaceCaps;
```

Here, the NumPreviousOutputFrames field indicates the required number of frames that have previously been output by the de-interlace algorithm. This parameter can be used by recursive de-interlace algorithms.

The InputPool field indicates the memory pool from which the interlaced source surfaces should be allocated. See, for example, the Direct3D® and DirectDraw® documentation in the above referenced text for a description of valid memory pool locations.

The NumForwardRefSamples field indicates the required number of additional reference samples that are temporally in the future for this de-interlace mode—none for BOB and line blending, and possibly several for adaptive de-interlacing and frame rate conversion.

The NumBackwardRefSamples field indicates the required number of additional reference samples that are temporally in the past for this de-interlace mode—none for BOB, one for line blending, and possibly several for adaptive de-interlacing and frame rate conversion.

The OutputFrameFormat field indicates the Direct3D surface format of the output frames. Usually a de-interlace algorithm would likely output frames in a surface format that matches the input sample format. This field ensures that renderer 310 will be able to supply the correct output frame surfaces to the de-interlacing hardware/logic. Note that if the DXVA_Deinterlace_YUV2RGB flag is returned in the VideoProcessingCaps field, renderer 310 may assume that the valid output formats are specified by this field as well as an RGB32 format.

The VideoProcessingCaps field identifies other operations that can be performed concurrently with the requested de-interlace. The following flags identify some exemplary operations:

DXVA_VideoProcess_SubRects. The de-interlace hardware/logic can operate on a sub-rectangle region of the video image. This is useful, for example, if the video image needs to be cropped before being processed further as the size of the output frames is reduced.

DXVA_VideoProcess_YUV2RGB. The de-interlace hardware/logic can convert the video from the YUV color space to the RGB color space. In certain implementations, the RGB format used will have at least 8 bits of precision for each color component. If this is possible, a buffer copy within renderer 310 can be avoided.

Note that, in certain implementations, the graphics device driver 320 should be able to support this operation for the BOB de-interlace mode. Color space conversion is particularly useful within renderer 310 if it can be combined with any (and ideally, all) of the following flags:

DXVA_VideoProcess_StretchX
DXVA_VideoProcess_StretchY
DXVA_VideoProcess_AlphaBlend Note that in this exemplary implementation there is not a requirement to convert from the RGB color space to the YUV color space.

DXVA_VideoProcess_StretchX. If the de-interlacer is able to stretch or shrink horizontally, aspect ratio correction can be performed at the same time as the video is being de-interlaced. This flag can be supported for the BOB de-interlace mode.

DXVA_VideoProcess_StretchY. Sometimes aspect ratio adjustment is combined with a general picture re-sizing operation to scale the video image within an application defined composition space. This is probably quite rare and will not be an essential feature n certain implementations. This flag can be supported for the BOB de-interlace mode. Typically, it is better if the scaling needed for resizing the video to fit into the application window can be done at the same time as the scaling needed for de-interlacing. For example, doing so avoids cumulative artifacts.

DXVA_VideoProcess_AlphaBlend. Again, this can avoid a buffer copy with renderer 310. Typically, it is very rare that applications alter the constant alpha value associated with the video stream, so in certain implementations this may be considered a "low" priority feature for system.

In certain implementations, other capabilities may also be identified. For example, other color/gamma modifying information may be identified. Rotation, sheering, and/or other similar processes may also be identified using the above techniques.

The DeinterlaceTechnology field identifies the underlying technology used to implement this particular de-interlacing algorithm. The following flags identify some exemplary operations; the flags may be combined as necessary to most closely match the algorithm's implementation:

DXVA_DeinterlaceTech_Unknown, indicates that the algorithm is unknown or proprietary to the hardware manufacturer.

DXVA_DeinterlaceTech_BOBLineReplicate, indicates that the algorithm creates the missing lines by repeating the line either above or below it—this method will look very jaggy and therefore may not be adequate for some uses.

DXVA_DeinterlaceTech_BOBVerticalStretch, wherein the algorithm creates the missing lines by vertically stretching each video field by a factor of two, for example, by averaging two lines or using a $[-1, 9, 9, -1]/16$ filter across four lines. Slight vertical adjustments may be made to ensure that the resulting image does not "bob" up and down.

DXVA_DeinterlaceTech_MedianFiltering, wherein the pixels in the missing line are recreated by a median filtering operation.

DXVA_DeinterlaceTech_EdgeFiltering, the pixels in the missing line are recreated by an edge filter or the like. In this process, for example, spatial directional filters may be applied to determine the orientation of edges in the picture content, and missing pixels created by filtering along (rather than across) the detected edges.

DXVA_DeinterlaceTech_FieldAdaptive, the pixels in the missing line may be recreated, for example, by switching on a field by field basis between using either spatial or temporal interpolation depending on the amount of motion.

DXVA_DeinterlaceTech_PixelAdaptive, the pixels in the missing line may be recreated, for example, by switching on a pixel by pixel basis between using either spatial or temporal interpolation depending on the amount of motion.

DXVA_DeinterlaceTech_MotionVectorSteered, Motion Vector Steering identifies objects within a sequence of video fields. The missing pixels are recreated after first aligning the movement axes of the individual objects in the scene to make them parallel with the time axis.

Creating a Stream:
Example: A "DeinterlaceStream" Object

After a suitable de-interlace mode GUID has been found, a DeinterlaceStream object can be created. Creation of a DeinterlaceStream object allows graphics device driver 320 to reserve any hardware resources (e.g., associated with GPU 322 or the like) that are required to perform the requested de-interlace or other selected operations.

Creating an Open Stream: "DeinterlaceOpenStream"

The DeinterlaceOpenStream method creates a DeinterlaceStream object. For example consider the following:

```
HRESULT
DeinterlaceOpenStream(
    [in] LPGUID pGuidDeinterlaceMode,
    [in] LPDXVA_VideoDesc lpVideoDescription,
    [out] HDXVA_DeinterlaceStream* lphDiStrm
    );
```

Here, the HDXVA_DeinterlaceStream output parameter is a handle to the DeinterlaceStream object and can be used to identify the stream in all future calls. Thus, consider the following example:

```
typedef struct _DXVA_VideoSample {
    REFERENCE_TIME rtStart;
    REFERENCE_TIME rtEnd;
    DXVA_SampleFormat SampleFormat;
    LPVOID lpDDSSrcSurface;
} DXVA_VideoSample, *LPDXVA_VideoSample;
```

Here, if the video sample contains two interleaved fields: DXVA_SampleFieldInterleavedEvenFirst, or DXVA_SampleFieldInterleavedOddFirst, then the start time of the second field may be calculated as follows:

rtStartSecondField=(rtStart+rtEnd)/2;

Note in the exemplary case above that the end time of the first field is the start time of the second field.

Example of De-Interlacing: "DeinterlaceBlt"

The DeinterlaceBlt method performs the de-interlace or frame rate conversion operation by writing the output to the destination surface. Hence, consider this:

```
HRESULT
DeinterlaceBlt(
    [in] HDXVA_DeinterlaceStream hDiStrm
        [in] REFERENCE_TIME rtTargetFrame,
        [in] LPRECT lprcDstRect,
        [in] LPDDSURFACE lpDDSDstSurface,
        [in] LPRECT lprcSrcRect,
        [in] LPDXVA_VideoSample lpDDSrcSurfaces,
        [in] DWORD dwNumSurfaces,
        [in] FLOAT fAlpha/*0.0F transparent, 1.0F opaque */
);
```

In the DeinterlaceBlt method, the rtTargetFrame parameter identifies the location of the output frame within the sequence of input frames. If only de-interlacing is being performed, then the target time will coincide with one of the rtStart times of a reference sample. If a frame rate conversion is being requested, the rtTargetFrame time may be different from any of the rtStart times of the reference samples.

Here, the source and destination rectangles are required for either sub-rectangle de-interlacing or stretching. Support for stretching is optional (and can be reported by Caps flags, for example). Support for sub-rectangles may not be needed in certain implementations.

The destination surface can be a Direct3D® off screen plain, Direct3D® render target, a Direct3D® texture, or the like, that is also a render target. In accordance with certain exemplary implementations, the destination surface will be allocated in local video memory.

The pixel format of the destination surface will be the one indicated in the DXVA_DeinterlaceCaps structure unless a YUV-to-RGB color space conversion is being performed as part of the de-interlace procedure. In this exemplary case, the destination surface format can be an RGB format with at least 8 bits of precision for each color component.

Closing a Stream: "DeinterlaceCloseStream"

The DeinterlaceCloseStream method closes the DeinterlaceStream object and instructs the device driver to release any hardware resource associated with this stream. For example, consider the following:

```
HRESULT
DeinterlaceCloseStream(
    HDXVA_DeinterlaceStream hDiStrm
);
```

Device Driver Interface (DDI) Mapping for the De-Interlace Interface

For compatibility with the DDI infrastructure for Windows® operating systems, the proposed APIs described earlier in this description and others like them can be "mapped" to the existing DDI for DirectDraw® and DirectX® VA. This section describes an exemplary de-interlace interface mapping to the existing DirectDraw® and DX-VA DDI.

The DX-VA DDI is itself split into two functional groups: the "DX-VA container" and the "DX-VA device."

The purpose of the DX-VA container DDI group is to determine the number and capabilities of the various DX-VA devices contained by the display hardware. Therefore, a DX-VA driver need only have a single container, while still supporting multiple DX-VA devices.

It is not possible to map the de-interlace device "query" calls on to any of the DDI entry points in the DX-VA container group because, unlike the rest of DX-VA, the container methods use typed parameters. However, the DX-VA device DDI group does not use typed parameters, so it is possible to map the proposed de-interlace interface to the methods in that group. The rest of this section describes how the new interfaces described herein can be mapped to the DX-VA device DDI.

The De-interlace Container Device

The DX-VA device methods do not use typed parameters, so the methods can be reused for many different purposes. However, the DX-VA device methods can only be used in the context of a DX-VA device, so it is necessary to first define and create a special "de-interlace container device". As used herein, the DX-VA de-interlace container device is a software construct only, and it does not represent any functional hardware contained on a device. The de-interlacing sample device driver code later in this specification shows how the container device could be implemented by a driver.

Calling the DDI from a User-Mode Component

The sequence of steps to use the DDI 314 from a user-mode component such as renderer 310 is as follows:

Call GetMoCompGuids to get the list of DX-VA devices supported by graphics device driver 320.

If the "de-interlace container device" GUID is present, call CreateMoComp to create an instance of this DX-VA device. The container device GUID can be defined as follows, for example:

DEFINE_GUID (DXVA_DeinterlaceContainerDevice, 0x0e85cb93, 0x3046, 0x4ff0,0xae, 0xcc, 0xd5, 0x8c, 0xb5, 0xf0, 0x35, 0xfc);

Call RenderMocomp with a dwFunction parameter that identifies a DeinterlaceQueryAvailableModes operation. The lpInputData parameter can be used to pass the input parameters to graphics device driver 320, which returns its output through the lpOutputData parameter.

Call RenderMocomp with a dwFunction parameter that identifies a DeinterlaceQueryModeCaps operation. Again, the lpInputData parameter can be used to pass the input parameters to graphics device driver 320, which returns its output through the lpOutputData parameter.

After renderer 310 has chosen the desired de-interlace device, it calls CreateMocomp to create an instance of this de-interlacing device.

Renderer 310 then calls the de-interlacing device's RenderMocomp with a function parameter of DXVA_DeinterlaceBltFnCode for each de-interlace operation.

When renderer 310 no longer needs to perform any more de-interlace operations, it calls DestroyMocomp.

Graphics device driver 320 releases any resources used by the de-interlacing device.

DeinterlaceQueryAvailableModes

This exemplary method maps directly to a call to the RenderMoComp method of the de-interlace container device. The DD_RENDERMOCOMPDATA structure can be completed as follows:

```
dwNumBuffers is zero.
lpBufferInfo is NULL.
dwFunction is defined as
DXVA_DeinterlaceQueryAvailableModesFnCode.
lpInputData will point to a completed DXVA_VideoDesc structure.
lpOutputData will point to the following structure:
#define MAX_DEINTERLACE_DEVICE_GUIDS 32
typedef struct _DXVA_DeinterlaceQueryAvailableModes {
    DWORD Size;
    DWORD NumGuids;
    GUID Guids[MAX_DEINTERLACE_DEVICE_GUIDS];
} DXVA_DeinterlaceQueryAvailableModes;
```

Note that the DX-VA container device's RenderMoComp method can be called without BeginMoCompFrame or EndMoCompFrame being called first.

DeinterlaceQueryModeCaps

This exemplary method maps directly to a call to the RenderMoComp method of the de-interlace container device. The DD_RENDERMOCOMPDATA structure can be completed as follows:

```
dwNumBuffers is zero.
lpBufferInfo is NULL.
dwFunction is defined as DXVA_DeinterlaceQueryModeCapsFnCode.
lpInputData will point to the following
DXVA_DeinterlaceQueryModeCaps structure.
typedef struct _DXVA_DeinterlaceQueryModeCaps {
    DWORD Size;
    GUID Guid;
    DXVA_VideoDesc VideoDesc;
} DXVA_DeinterlaceQueryModeCaps;
```

Here, lpOutputData will point to a DXVA_DeinterlaceCaps structure. Note that the DX-VA container device's RenderMoComp method can be called without BeginMoCompFrame or EndMoCompFrame being called first.

DeinterlaceOpenStream

This exemplary method maps directly to a CreateMoComp method of the DD_MOTIONCOMPCALLBACKS structure, where the GUID is the de-interlace type requested, pUncompData points to a structure that contains no data (all zeros), and pData points to a DXVA_VideoDesc structure.

If a driver supports accelerated decoding of compressed video, renderer 310 may call the driver to create two DX-VA devices, one to perform the actual video decoding work as defined by the DirectX® VA Video Decoding specification, and the other to be used for de-interlacing.

Example: Mapping CreateMoComp to DeinterlaceOpenStream

The exemplary sample code below illustrates how the driver may map the CreateMoComp DDI call into calls to DeinterlaceOpenStream. The sample code shows only how the CreateMocComp function is used for de-interlacing. If the driver supports other DX-VA functions such as decoding MPEG-2 video streams, the sample code below can be extended to include processing of additional DX-VA GUIDs.

```
DWORD APIENTRY CreateMoComp(PDD_CREATEMOCOMPDATA
lpData )
{
// DXVA_DeinterlaceStream is data structure defined by the driver
// to store any data required for the driver
// to de-interlace this particular video data
//
    LPDXVA_DeinterlaceStream pDXVA_State = NULL;
    // Make sure it's a guid we like.
    if (FAILED(ValidDXVAGuid(lpData->lpGuid))) {
        lpData->ddRVal = E_INVALIDARG;
        return DDHAL_DRIVER_HANDLED;
    }
// Look for the deinterlace container device GUID
if (*lpData->lpGuid == DXVA_DeinterlaceContainerDevice) {
    DXVA_DeinterlaceContainerDeviceClass* lpDev =
        new DXVA_DeinterlaceContainerDeviceClass(*lpData->lpGuid,
                DXVA_DeviceContainer);
    if (lpDev) {
        lpData->ddRVal = DD_OK;
    }
    else {
        lpData->ddRVal = E_OUTOFMEMORY;
    }
    lpData->lpMoComp->lpDriverReserved1 =
            (LPVOID)(DXVA_DeviceBaseClass*)lpDev;
    return DDHAL_DRIVER_HANDLED;
}
// Look for the deinterlace BOB device GUID
if (*lpData->lpGuid == DXVA_DeinterlaceBobDevice) {
    DXVA_DeinterlaceBobDeviceClass* lpDev =
        new DXVA_DeinterlaceBobDeviceClass(*lpData->lpGuid,
DXVA_DeviceDeinterlacer);
```

```
    if (lpDev) {
        LPDXVA_VideoDesc lpVideoDescription =
            (LPDXVA_VideoDesc)lpData->lpData;
        lpData->ddRVal = lpDev->DeinterlaceOpenStream(
lpVideoDescription);
        if (lpData->ddRVal != DD_OK) {
            delete lpDev;
            lpDev = NULL;
        }
    }
    else lpData->ddRVal = E_OUTOFMEMORY;
    lpData->lpMoComp->lpDriverReserved1 =
(LPVOID)(DXVA_DeviceBaseClass*)lpDev;
    return DDHAL_DRIVER_HANDLED;
}
lpData->ddRVal = DDERR_CURRENTLYNOTAVAIL;
return DDHAL_DRIVER_HANDLED;
}
```

Example: Implementing "GetMoCompGuids"

In addition to the CreateMoComp DDI function the driver can also implement the GetMoCompGuids method of the DD_MOTIONCOMPCALLBACKS structure. The following exemplary sample code shows one possible way of implementing this function in the driver.

```
// This is the list of all DV-VA device GUIDs supported by
// the driver - this list will include decoder, de-interlacing and
// the de-interlacing container device. There is no significance to
// the order of the GUIDs on the list.
//
DWORD g_dwDXVANumSupportedGUIDs = 4;
const GUID* g_DXVASupportedGUIDs[4] = {
    &DXVA_DeinterlaceContainerDevice,
    &DXVA_Deinterlace3Samples,
    &DXVA_Deinterlace2Samples,
    &DXVA_DeinterlaceBobDevice
};
//
// This is the list of de-interlacing devices, in order of
// visual quality.
//
DWORD g_dwDXVADeinterlaceNumSupportedGUIDs = 3;
const GUID* g_DXVADe-interlacedSupportedGUIDs[3] = {
// replace this GUID with the own implementation
    &DXVA_Deinterlace3Samples,
// replace this GUID with the own implementation
    &DXVA_Deinterlace2Samples,
// everyone has to support BOB
    &DXVA_DeinterlaceBobDevice
};
DWORD APIENTRY
GetMoCompGuids(
    PDD_GETMOCOMPGUIDSDATA lpData
    )
{
    DWORD dwNumToCopy;
    // Check to see if this is a GUID request or a count request
    if (lpData->lpGuids) {
        dwNumToCopy = min(g_dwDXVANumSupportedGUIDs,
            lpData->dwNumGuids);
        for (DWORD i = 0; i < dwNumToCopy; i++) {
            lpData->lpGuids[i] = *g_DXVASupportedGUIDs[i];
        }
    }
    else {
        dwNumToCopy = g_dwDXVANumSupportedGUIDs;
    }
    lpData->dwNumGuids = dwNumToCopy;
    lpData->ddRVal = DD_OK;
    return DDHAL_DRIVER_HANDLED;
}
```

DeinterlaceBlt

This exemplary method maps directly to a RenderMoComp method of the DD_MOTIONCOMPCALLBACKS structure, where:

dwNumBuffers is 1+the number of source surfaces lpBufferInfo points to an array of surfaces. The first surface is the destination surface, and the remaining surfaces are the source surfaces.

dwFunction is defined as DXVA_DeinterlaceBltFnCode.

lpInputData will point to the following structure:

```
#define MAX_DEINTERLACE_INPUT_SURFACES 32
typedef struct _DXVA_DeinterlaceBlt
{
    DWORD Size;
    REFERENCE_TIME rtTargetFrame;
    RECT DstRect;
    RECT SrcRect;
    DWORD NumSourceSurfaces;
    FLOAT fAlpha;
    DXVA_VideoSample
Source[MAX_DEINTERLACE_INPUT_SURFACES];
} DXVA_DeinterlaceBlt;
lpOutputData is NULL.
```

Note that for the DX-VA device used for de-interlace, RenderMoComp will be called without calling BeginMoCompFrame or EndMoCompFrame.

Example: Mapping RenderMoComp to DeinterlaceBlt

The exemplary sample code below shows how the driver may map the RenderMoComp DDI call into calls to DeinterlaceBlt. The sample code only shows how the RenderMoComp function is used for de-interlacing. If the driver supports other DX-VA functions such as decoding MPEG-2 video streams, the sample code can be extended to include processing of additional DX-VA GUIDs.

```
DWORD APIENTRY
RenderMoComp(
    PDD_RENDERMOCOMPDATA lpData
    )
{
    LPDXVA_DeinterlaceStream pDXVAState =
        (LPDXVA_DeinterlaceStream)lpData->lpMoComp-
>lpDriverReserved1;
    DXVA_DeinterlaceBlt* lpBlt =
        (DXVA_DeinterlaceBlt*)lpData->lpInputData;
    LPDDMOCOMPBUFFERINFO lpBuffInfo = lpData->BufferInfo;
```

-continued

```
    for (DWORD i = 0; i < lpBlt->NumSourceSurfaces; i++) {
        lpBlt->Source[i].lpDDSSrcSurface =
            lpBuffInfo[1 + i].lpCompSurface;
    }
    lpData->ddRVal = DeinterlaceBlt(pDXVAState,
        lpBlt->rtTarget,
        &lpBlt->DstRect,
        lpBuffInfo[0].lpCompSurface,
        &lpBlt->SrcRect,
        &lpBlt->Source,
        lpBlt->NumSourceSurfaces,
        lpBlt->Alpha);
    return DDHAL_DRIVER_HANDLED;
}
```

DeinterlaceCloseStream

This exemplary method maps directly to a DestroyMo-Comp method of the DD_MOTIONCOMPCALLBACKS structure.

Example: Mapping DestroyMoComp to DeinterlaceCloseStream

The following exemplary sample code shows how the driver may map the DestroyMoComp DDI call into calls to DeinterlaceCloseStream. The sample code shows only how the DestroyMoComp function is used for de-interlacing. If the driver supports other DX-VA functions such as decoding MPEG-2 video streams, the sample code below can be extended to include processing of additional DX-VA GUIDs.

```
DWORD APIENTRY
DestroyMoComp(
    PDD_DESTROYMOCOMPDATA lpData
    )
{
    LPDXVA_DeinterlaceStream pDXVAState =
        (LPDXVA_DeinterlaceStream)lpData->lpMoComp-
        >lpDriverReserved1;
    lpData->ddRVal = DeinterlaceCloseStream(pDXVAState);
    lpData->lpMoComp->lpDriverReserved1 = NULL;
    return DDHAL_DRIVER_HANDLED;
}
```

CONCLUSION

In accordance with the various exemplary implementations presented herein, the present invention addresses the problem of de-interlacing of video image data so that it displays correctly on a computer monitor or other like display device. As noted, conventional de-interlacing techniques typically require the use of a "graphics overlay device" by the graphics processor which has several restrictions and limitations. With the various methods and apparatuses described herein, for example, a graphics processor can be instructed as to how to de-interlace a video field to produce a single video frame that can be displayed on a computer monitor so that interlaced video is displayed correctly in real time. By way of further example, various APIs have also been shown, some of which specifically extend Microsoft® DirectX® VA to support de-interlacing and/or frame rate conversion for video content in graphic device drivers.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. A method for closing a video stream object between a rendering process and a graphics device having an associated graphics device driver, the method comprising:
    issuing, by a rendering process, a close stream call having at least one call parameter comprising a stream identifier corresponding to a previously established video stream object; and
    receiving, by a supporting process, said close stream call and parsing said close stream call to retrieve said at least one call parameter, and causing said supporting process to close said previously established video stream object.

2. The method as recited in claim 1, wherein said supporting process includes at least one application programming interface (API).

3. A computer-readable medium having computer-executable instructions for causing at least one processing unit to perform acts comprising:
    issuing, by a rendering process, a close stream call having at least one call parameter comprising a stream identifier corresponding to a previously established video stream object; and
    receiving, by a supporting process, said close stream call and parsing said close stream call to retrieve said at least one call parameter, and causing said supporting process to close said previously established video stream object.

4. The computer-readable medium as recited in claim 3, wherein said supporting process includes at least one application programming interface (API).

* * * * *